(No Model.) 3 Sheets—Sheet 1.
M. MACDOUGALL.
MACHINE SCREW MACHINE.
No. 502,371. Patented Aug. 1, 1893.
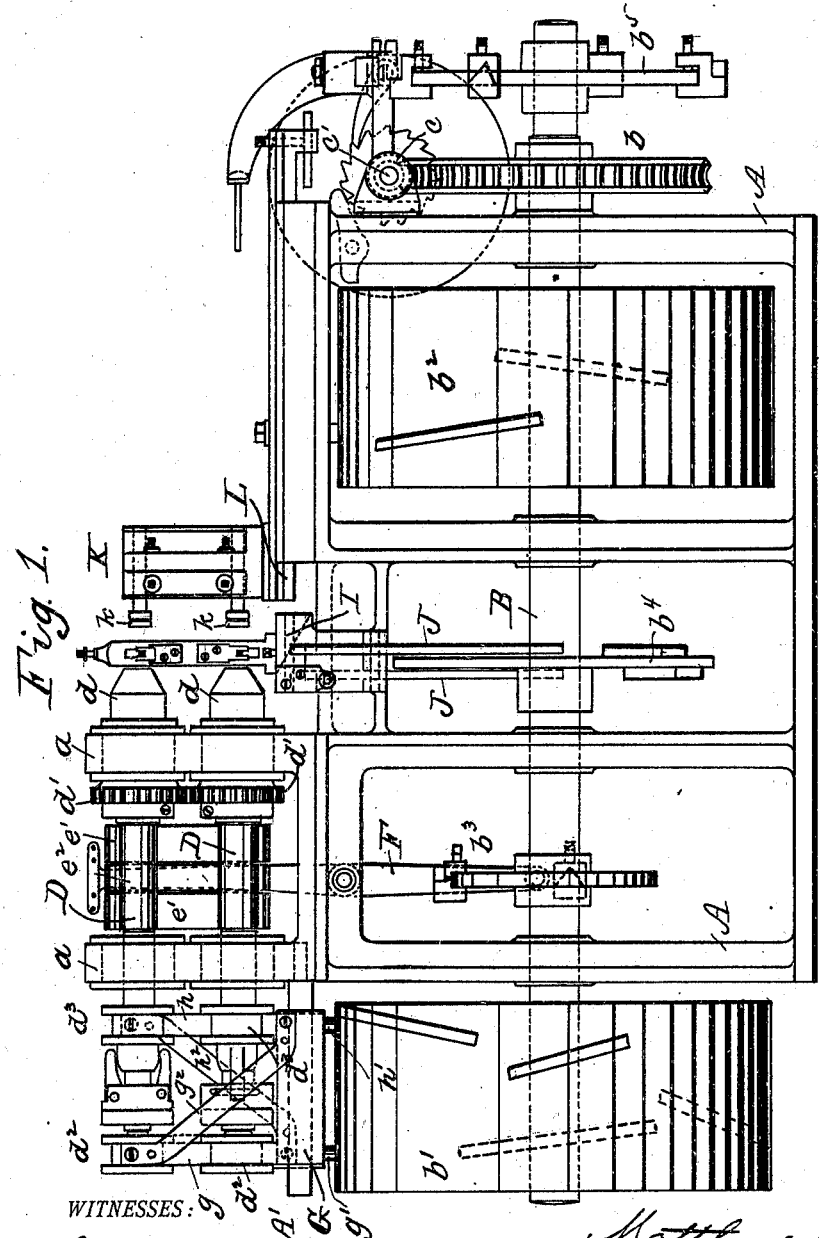
WITNESSES:
C. M. Sweeney
A. D. Cushman
INVENTOR:
Matthew Macdougall
BY
Macleod, Calver & Randall
ATTORNEYS.

(No Model.)  M. MACDOUGALL.  3 Sheets—Sheet 2.
MACHINE SCREW MACHINE.
No. 502,371.  Patented Aug. 1, 1893.
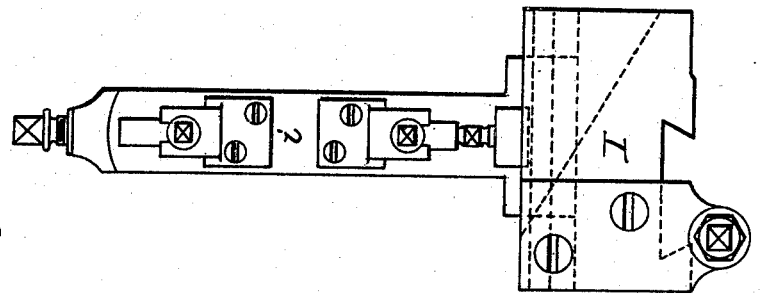
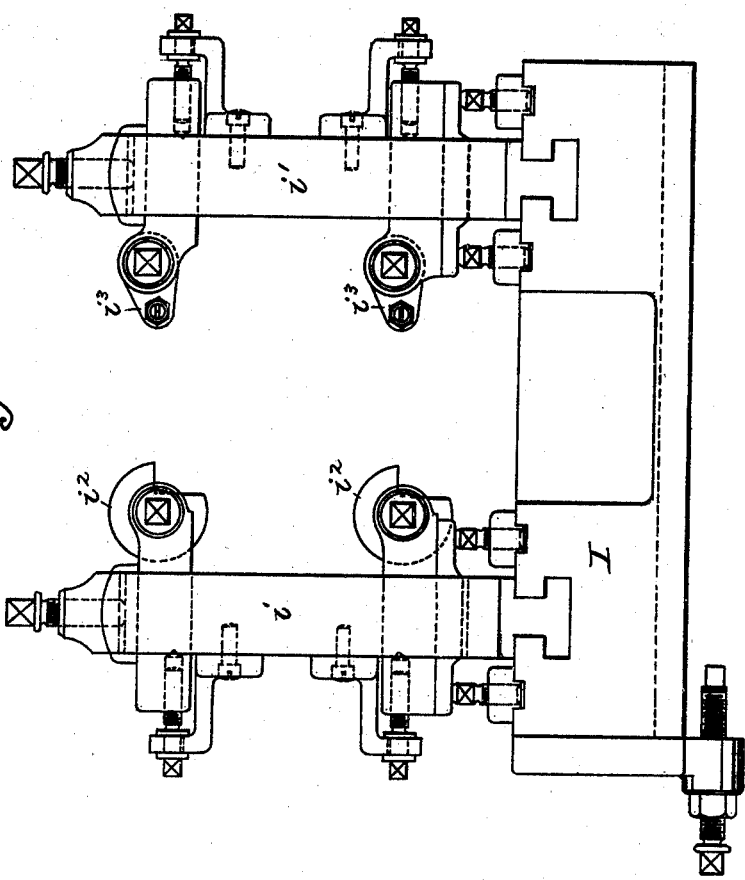
WITNESSES:  INVENTOR:
C. M. Sweeney  Matthew Macdougall,
A. D. Cushman  BY
  Macleod, Calver & Randall,
  ATTORNEYS.

(No Model.)
M. MACDOUGALL.
MACHINE SCREW MACHINE.
No. 502,371. Patented Aug. 1, 1893.
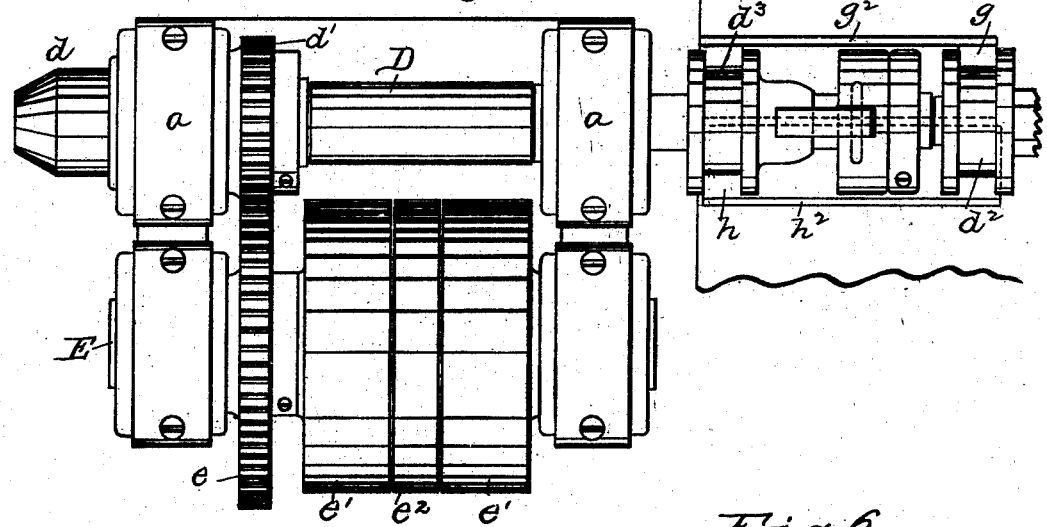
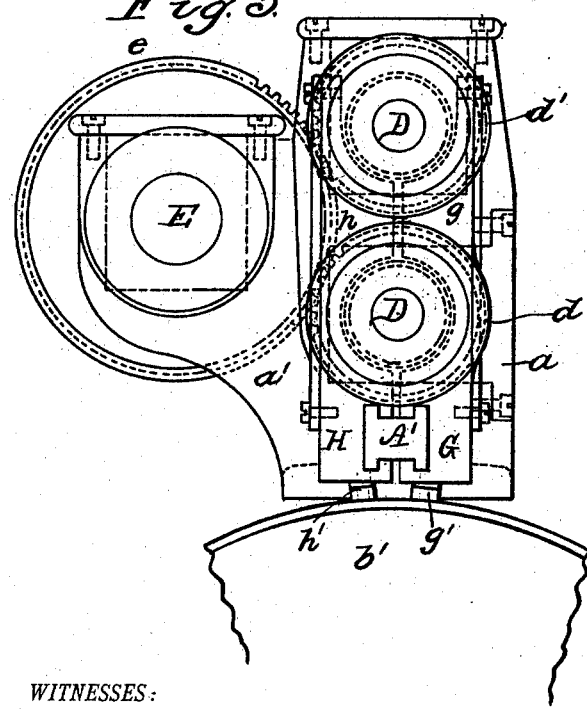
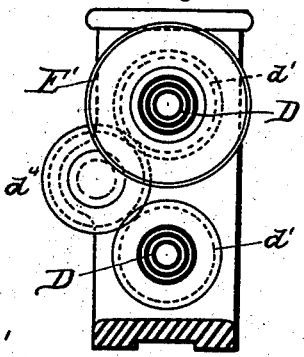
WITNESSES:
C. M. Sweeney
A. B. Cushman
INVENTOR:
Matthew Macdougall
BY
Macleod, Calver & Randall
ATTORNEYS

UNITED STATES PATENT OFFICE.

MATTHEW MACDOUGALL, OF ELIZABETH, NEW JERSEY, ASSIGNOR TO THE SINGER MANUFACTURING COMPANY OF NEW JERSEY.

MACHINE-SCREW MACHINE.

SPECIFICATION forming part of Letters Patent No. 502,371, dated August 1, 1893.

Application filed June 27, 1892. Serial No. 438,163. (No model.)

*To all whom it may concern:*

Be it known that I, MATTHEW MACDOUGALL, a citizen of the United States, residing at Elizabeth, in the county of Union and State of New Jersey, have invented certain new and useful Improvements in Machine-Screw Machines, of which the following is a specification, reference being had therein to the accompanying drawings.

My invention relates to that class of screw cutting machines in which the different operations necessary for cutting or turning down the stock for the formation of screws, threading the screw blanks thus formed, and then severing the threaded screws from the stock-bar or wire are automatically and successively performed; my invention having for its object to increase the capacity for work, and consequently the product, of the class of machines referred to. This object I accomplish by providing a plurality of stock-carrying spindles, cutting tools and threading dies, in connection with proper mechanism for operating the same, so that instead of making a single screw two or more screws may be made at a single operation.

In the accompanying drawings Figure 1 is a side elevation of a screw cutting machine embodying my invention. Fig. 2 is a detail side view of the tool-carrying slide, and Fig. 3 is an end view thereof. Fig. 4 is a partial plan view to show the driving mechanism for the spindles, and Fig. 5 is a partial end elevation showing the same. Fig. 6 illustrates a slightly modified form of driving mechanism.

A denotes the frame-work of the machine and B the cam or tappet shaft thereof journaled in suitable bearings formed in the said frame, said shaft being provided with a driving worm wheel $b$ meshing with a worm wheel $c$ on a transverse driving shaft $c'$, the latter shaft being operated by a suitable belt, not shown. Mounted on the shaft B are the cam or tappet wheels $b'$, $b^2$, $b^3$, $b^4$ and $b^5$ which are, or may be, of ordinary construction and which operate the several mechanisms of the machine in the usual way.

The frame A is furnished with posts or standards $a$ in which are journaled the stock-carrying spindles D provided at their forward ends with clutch-heads $d$; the said spindles also having the gears $d'$ by which they are rotated and which are both engaged by a driving gear $e$ on a driving shaft E supported by suitable brackets $a'$ formed integral with or attached to the posts or standards $a$, said shaft E having the fast pulleys $e'$ and the intermediate loose pulley $e^2$ on which latter the driving belts, which run in opposite directions, (as is usual in this class of machines) are alternately shifted by the belt shipper F operated from the cam or tappet wheels $b^3$ on the shaft B.

The spindles D are provided at their rear ends with the grooved wheels $d^2$ engaged by a post $g$ on the slide G operated by tappets on the wheel $b'$ which tappets engage the depending stud or projection $g'$ on said slide, the longitudinal movements of said spindles, imparted thereto from said slide, being for the purpose of feeding forward the stock. The spindles D are also furnished with the grooved wheels $d^3$ mounted on sleeves forming parts of said spindles, in that they rotate therewith, said sleeves being longitudinally movable independently of the clutch-carrying parts of the spindles for the purpose of clamping and releasing the clutch jaws in the usual manner in machines of the class to which my invention relates. The grooved wheels $d^3$ are engaged by a post $h$ on a slide H having the depending stud or pin $h'$ operated by tappets on the wheel $b'$. The slides G and H are guided in suitable ways on a bar A' extending from the frame A and the posts $g$ and $h$ on said slides are steadied by braces $g^2$ and $h^2$, respectively, connecting the upper ends of said posts with said slides.

I is the cutting-tool carrying-slide mounted, to reciprocate cross wise of the machine, in suitable guide-ways on the frame A, said slide being operated by the levers J receiving movements from the tappet-wheel $b^4$. The slide I carries two posts $i$ and $i'$ on the former of which are mounted the cutting tools $i^2$, while the post $i'$ is herein shown as being furnished with the projections $i^3$ which form stops to limit the forward feeding movements of the rods or wires from which the screws are made, but the said post $i'$ may also be provided with any suitable cutting or knurling tools, if desired.

K denotes a post or turret carrying the threading dies $k$, the said post or turret being mounted on a slide L arranged to move lengthwise of the machine and having a depending pin or stud $k'$ engaged by cams or tappets on the wheel $b^2$ to operate said slide.

By reference to Figs. 4 and 5 it will be seen that the driving gear $e$ is of such size as to engage the gears $d'$ on the spindles D so that said spindles are both caused to rotate in the same direction as is necessary to cause the screw to be threaded properly by the threading dies. Instead, however, of driving the duplex spindles by the gear $e$ which engages the gears on said spindles one spindle may be driven from and be caused to rotate in the same direction as the other by the arrangement of parts shown in Fig. 6 in which the upper spindle D is shown as being furnished with the driving pulleys $e'$, the gears $d'$ on said spindles being connected by the intermediate gears $d^4$ which causes the lower spindle to rotate in the same direction as the upper or driving spindle.

From the foregoing it will be apparent that by the use of my improvements I am enabled to double the capacity of an automatic screw-cutting machine, as the duplicate spindles, cutting tools and threading dies adapt the machine to make two screws at one operation, instead of a single screw, as heretofore. I do not, however, wish to be understood as limiting my invention to the use of two similarly rotating spindles with corresponding cutting tools and threading dies, as by making the other parts of the machine sufficiently strong three or more stock-carrying spindles, all geared to rotate in the same direction, may be employed in one machine in combination with a similar number of cutting tools and threading dies, my invention therefore comprising a plurality of these parts in a screw cutting machine.

It will, of course, be understood that my improved double spindle machine may be used for forming screw blanks, (to be threaded at a separate operation) if desired, and in such case the turret or post carrying the threading dies may be omitted or removed, or permitted to work idly; also, if desired, the machine may be used for turning bowls or cam-rollers, or for other purposes; and in such case instead of the threading dies on the post or turret K the latter will be supplied with other suitable tools co-operating with the cutting tools on the transversely-movable slide I. It will therefore be seen that parts of my invention may be employed without using the entire machine organized as shown in the drawings and as hereinbefore described.

Having thus described my invention, I claim and desire to secure by Letters Patent—

In a screw cutting machine, the combination with the frame A, the shaft B and the cam or tappet wheels carried by the latter, of the stock-carrying spindles D, driving gearing for said spindles causing them to rotate in the same direction, the slides G and H connected with said spindles to move the same longitudinally, the transversely movable slide I, the posts $i$ and $i'$ mounted thereon, the cutting tools $i^2$ carried by the said post $i$, the stops $i^3$ carried by the said post $i'$, the levers J and tappet wheel $b^4$ for operating said slide, the longitudinally movable post or turret K, the threading dies $k$ carried thereby, the slide L on which said post or turret is mounted, and the tappet wheel $b^2$ for operating said slide L.

In testimony whereof I affix my signature in presence of two witnesses.

MATTHEW MACDOUGALL.

Witnesses:
HENRY CALVER,
EDWARD BRYCE.